(12) United States Patent
Bancs

(10) Patent No.: US 11,871,070 B2
(45) Date of Patent: Jan. 9, 2024

(54) METHOD AND SYSTEM FOR AGGREGATING LIVE STREAMS

(71) Applicant: WWEEVV Pty Ltd, Pyrmont (AU)

(72) Inventor: George Bancs, Pyrmont (AU)

(73) Assignee: WWEEVV Pty Ltd, Pyrmont (AU)

( * ) Notice: Subject to any disclaimer, the term of this patent is extended or adjusted under 35 U.S.C. 154(b) by 0 days.

(21) Appl. No.: 17/781,703

(22) PCT Filed: Dec. 2, 2020

(86) PCT No.: PCT/IB2020/061349
§ 371 (c)(1),
(2) Date: Jun. 1, 2022

(87) PCT Pub. No.: WO2021/111310
PCT Pub. Date: Jun. 10, 2021

(65) Prior Publication Data
US 2023/0007333 A1    Jan. 5, 2023

(30) Foreign Application Priority Data
Dec. 2, 2019 (AU) ................................ 2019904548

(51) Int. Cl.
*H04N 21/81* (2011.01)
*H04N 21/431* (2011.01)
*H04N 21/414* (2011.01)

(52) U.S. Cl.
CPC ....... *H04N 21/4312* (2013.01); *H04N 21/414* (2013.01); *H04N 21/812* (2013.01)

(58) Field of Classification Search
CPC .................................................. H04N 21/812
See application file for complete search history.

(56) References Cited

U.S. PATENT DOCUMENTS

| | | |
|---|---|---|
| 2008/0127272 A1 | 5/2008 | Cragun |
| 2010/0131997 A1 | 5/2010 | Locker |
| 2016/0196025 A1* | 7/2016 | Amidon ............... H04N 21/252 715/716 |
| 2018/0359532 A1 | 12/2018 | Groman |
| 2018/0367861 A1 | 12/2018 | Sanghavi et al. |
| 2020/0068232 A1* | 2/2020 | Lipczynski ...... H04N 21/25883 |

* cited by examiner

*Primary Examiner* — Michael H Hong
(74) *Attorney, Agent, or Firm* — FisherBroyles, LLP; Cara L. Crowley-Weber

(57) ABSTRACT

A method, comprising receiving live video streams from different live streaming platforms, presenting the live video streams to users in video tiles in an aggregated live streaming platform, and allowing the users to navigate and select among the video tiles of the aggregated live streaming platform to view and interact with the live video streams.

8 Claims, 8 Drawing Sheets

METHOD AND SYSTEM FOR AGGREGATING LIVE STREAMS

CROSS-REFERENCE TO RELATED APPLICATIONS

This application is a 35 USC § 371 national stage filing of International Patent Application serial number PCT/IB2020/061349, entitled "Method and System for Aggregating Live Streams," filed Dec. 2, 2020, which application claims the benefit of priority to Australian Patent Application number AU2019904548, entitled "Method and System for Aggregating Live Streams," filed Dec. 2, 2019, the contents which applications are hereby incorporated by reference.

FIELD

The present invention relates to a method and system for aggregating live streams.

BACKGROUND

Content creators use live streaming platforms to distribute live content to their audience. The content can cover a broad range of topics such as live news and events, live presentations, live sports, educational live streams, and entertainment which includes live performances, or players live streaming playing of video games.

There are a number of live streaming platforms for content creators to choose from, and still more platforms are likely to become available in future. Examples of existing live streaming platforms include Facebook™, YouTube™, LinkedIn™, Periscope™, Mixer™, Instagram™, and Twitch™.

Existing approaches to live streaming content suffers from several drawbacks. Content creators often have to commit to a single live streaming platform to publish content. As a result, a prospective viewer has to browse across multiple platforms to find the content that appeals most to the viewer. Locking content creators into a single live streaming platform can therefore limit the size and demographic of the content creator's audience and isolate the content creator from additional potential viewers.

In this context, there is a need for an improved method and system for aggregating live streams.

SUMMARY

According to the present invention, there is provided a method, comprising:
  receiving live video streams from different live streaming platforms;
  presenting the live video streams to users in video tiles in an aggregated live streaming platform;
  allowing the users to navigate and select among the video tiles of the aggregated live streaming platform to view and interact with the live video streams.

The method may further comprise analysing the live video streams to identify the live video streams with and without advertising.

The method may further comprise, for the live video streams without advertising, visually indicating availability to add advertising to the live video streams in the video tiles.

The availability to add advertising to the live video streams may be visually indicated in the video tiles by icons, for example, icon buttons labelled "AD".

The method may further comprise, for live video streams with advertising, identifying a type, timing and location of the advertising in the live video streams.

The method may further comprise, for live video streams with advertising, adding additional advertising having a different type, timing and location to the live video streams.

The method may further comprise configuring the aggregated live streaming platform to perform two or more operations selected from:
  managing the live video streams;
  manipulating the live video streams;
  broadcasting the live video streams;
  curating the live video streams;
  hosting the live video streams;
  editing the live video streams;
  switching between the live video streams;
  sequencing the live video streams;
  fragmenting the live video streams;
  adding advertising to the live video streams;
  adding pre-recorded video to the live video streams;
  adding text or graphics to the live video streams;
  providing live engagement tools during the live video streams;
  providing live questions and answers during the live video streams;
  providing live polls during the live video streams;
  providing live audience chat during the live video streams;
  providing personalised feeds of the live video streams to the users;
  receiving live votes for the live video streams from the users;
  receiving live rewards from the users for creators of the live video streams;
  notifying the creators that their live video streams have started live streaming on the aggregated live streaming platform;
  notifying the users that the live video streams have started live streaming on the aggregated live streaming platform based on viewing history, likes and follows;
  recommending the live video streams to the users based on viewing history, likes and follows;
  allowing the users to discover the live video streams based on viewing history, likes and follows;
  allowing the users to navigate the live video streams;
  allowing the users to select the live video streams for viewing;
  allowing the users to like the live video streams;
  allowing the users to share the live video streams with other users;
  allowing the users to comment on the live video streams;
  allowing the users to follow the creators of the live video streams;
  allowing the users to recommend the live video streams to other users;
  allowing the users to communicate with other users during the live video streams;
  allowing the different live streaming platforms to integrate their live video streams into the aggregated live streaming platform.

The present invention further provides a system, comprising:
  a non-transitory memory; and
  one or more hardware processors coupled to the non-transitory memory and configured to read instructions from the non-transitory memory to cause the system to perform operations comprising:

receiving live video streams from different live streaming platforms;

presenting the live video streams to users in video tiles in an aggregated live streaming platform;

allowing the users to navigate and select among the video tiles of the aggregated live streaming platform to view and interact with the live video streams.

The present invention also provides a non-transitory machine-readable medium having stored thereon machine-readable instructions executable to cause a machine to perform operations comprising:

receiving live video streams from different live streaming platforms;

presenting the live video streams to users in video tiles in an aggregated live streaming platform;

allowing the users to navigate and select among the video tiles of the aggregated live streaming platform to view and interact with the live video streams.

BRIEF DESCRIPTION OF DRAWINGS

Embodiments of the invention will now be described by way of example only with reference to the accompanying drawings, in which.

DESCRIPTION OF EMBODIMENTS

Figure 1:
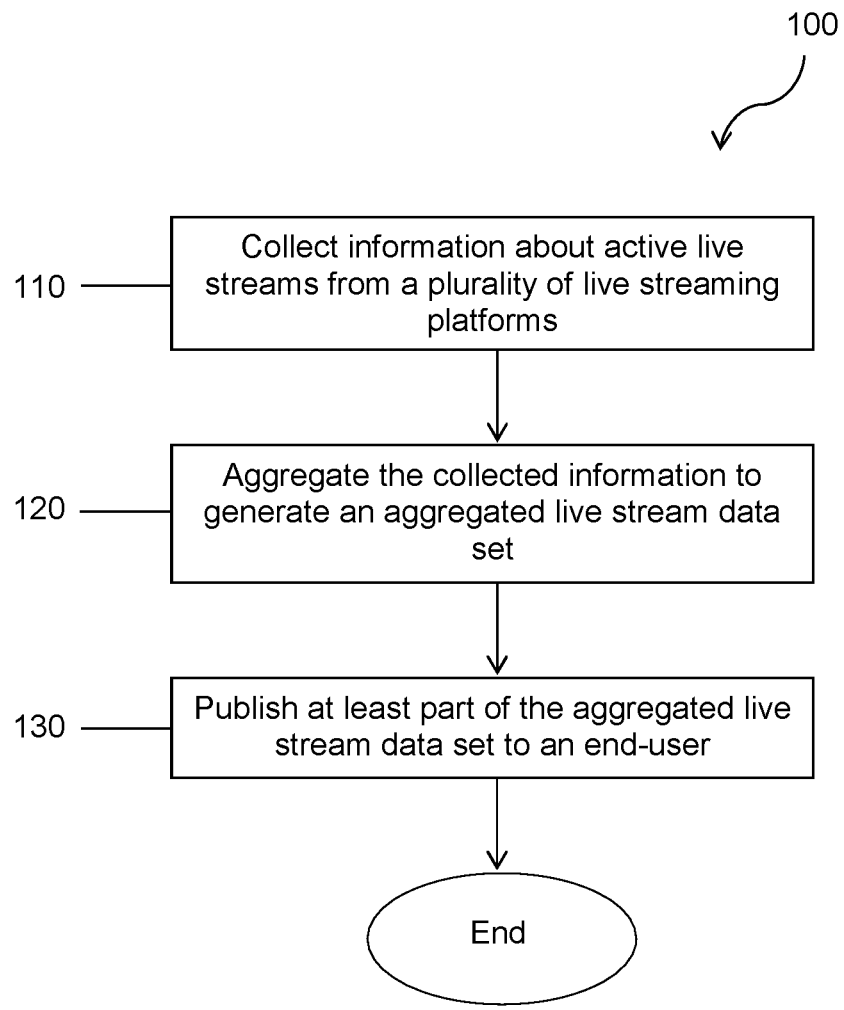
FIG. 1 is an example flow chart of a method for aggregating live streams according to an example embodiment of the present invention.

Referring to FIG. 1, an example method 100 for aggregating live streams according to an example embodiment of the present invention starts at step 110 collecting information about active live streams from a plurality of live streaming platforms. The live streams may include content which covers, for example, live news events, gaming, live sporting events, live entertainment, business events, live music, educational presentations, and live presentations covering technology. The platforms on which these streams are distributed include, but are not limited to, Facebook™, YouTube™, LinkedIn™, Periscope™, Mixer™, Instagram™, and Twitch™.

Next, at step 120, the collected information is aggregated to generate an aggregated live stream data set. The method 100 may end at step 130 at least part of the aggregated live stream data set is published to an end-user.

Figure 2:
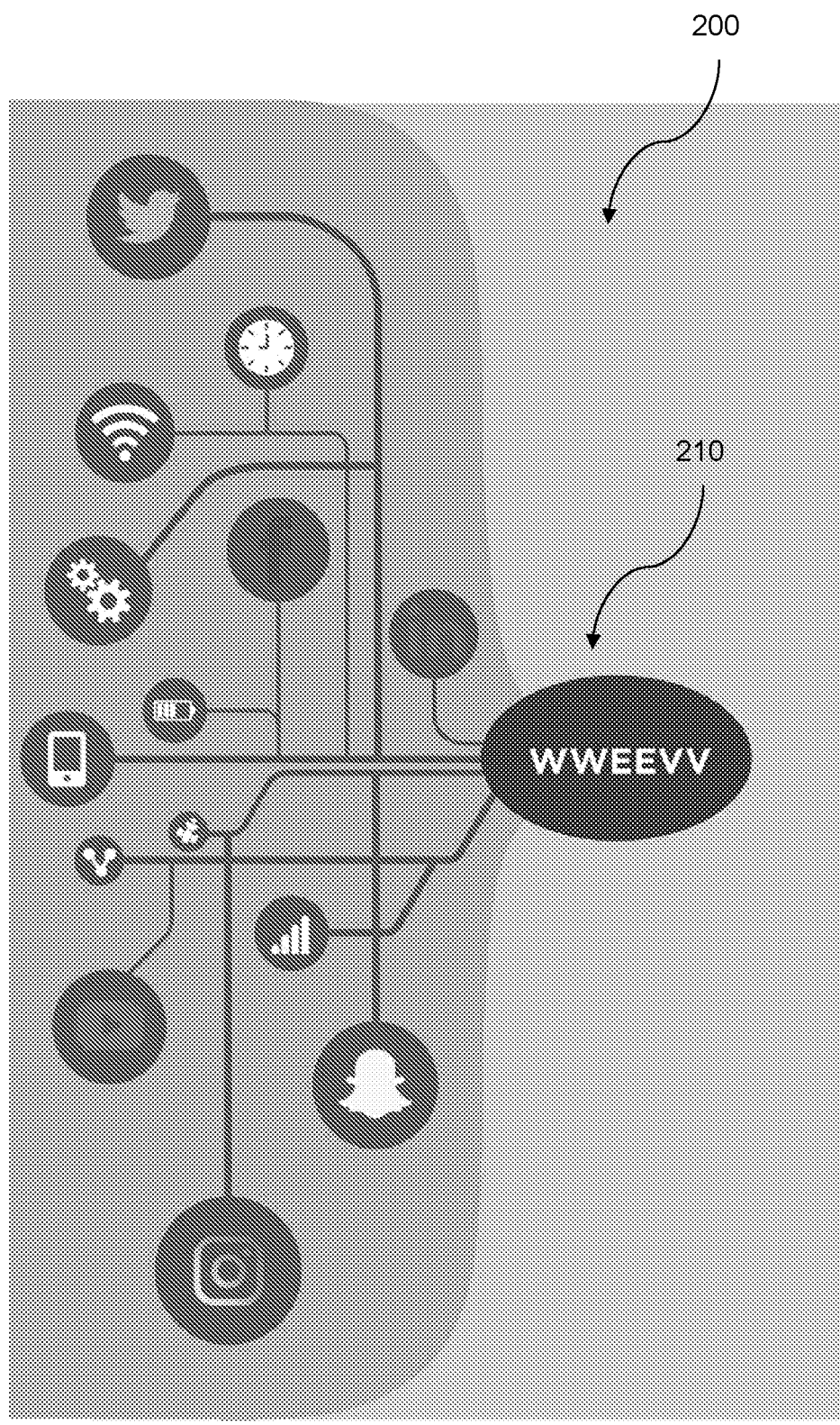
FIG. 2 is an example high level dataflow diagram illustrating an example system for aggregating live streams according to an example embodiment of the present invention.

FIG. 2 illustrates an example high level dataflow diagram illustrating an example system 200 for implementing the method 100 as a live stream aggregating platform 210 which publishes data to a software application (or "app") running on a mobile device such as a smartphone, tablet or laptop.

The live stream aggregating platform 210 may interface via application programming interfaces (APIs) to the live streaming platforms 220 to collect the information about active live streams. The live stream aggregation platform 210 then performs the necessary data processing on collected information to aggregate the collected information to generate the aggregated live stream data set. Data processing may include one or more of parsing, reordering, reformatting, and matching the information collected from different live streaming platforms to generate the aggregated live stream dataset.

Further or alternatively, the live stream aggregating platform 210 may collect the information about active live streams through web scraping. Web scraping may entail generating automatically operated user accounts to gather information from live streaming platforms 220. Similarly, the information collected through web scraping may then be processed to match all collected information from different live streaming platforms 220.

The collected information for each live stream may include details such as: the associated live streaming platform, a description of the content, viewership numbers, stream language and any communications or "chat" associated with the active live stream. The collected information may also include a visual representation of the live stream, such as for example, a screen capture. The collected information may also include a link or URL address for the live stream.

Figure 3:
FIGS. 3 to 7 are example graphical user interfaces (GUIs) generated by an example mobile device application for aggregating live streams according to an example embodiment of the present invention.

Referring to FIGS. 3 to 7, the method 100 may, in part, be performed using GUIs generated by the mobile device application for aggregating live streams. FIG. 3 illustrates an example GUI 300 which requires the end-user to input login details into the application for aggregating live streams. Logging into this application may be linked to log the end-user into associated live streaming platforms. Logins to associated live streaming platforms may be needed where specific user details are required before content can be accessed. The live stream aggregating platform 210 may be configured manage and store multiple live stream platform login details for each user.

Figure 4:
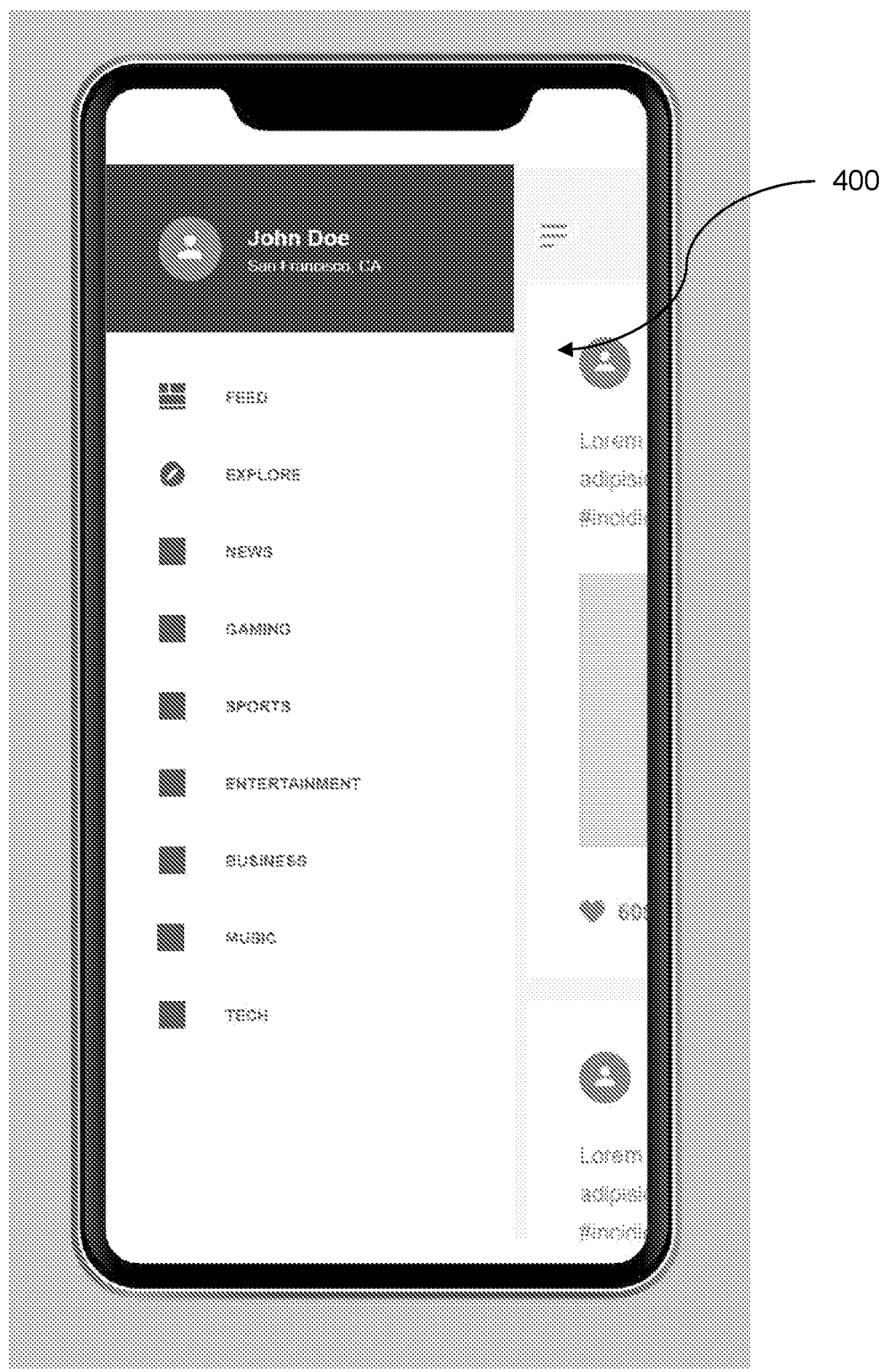

FIG. 4 illustrates an example GUI 400 which allows the end-user to define criteria for sorting the aggregated live stream dataset. For example, the user may choose to be shown only live streams that relate to music or sports. As a result, the user will not be presented with active live streams providing unrelated content. The published live stream dataset may not be limited only by the user selected criteria, but may, for example also be limited by system defined criteria. The published live stream dataset may for example be sorted to first display promoted streams or streams with the highest number of viewers. Other system defined criteria by which the published dataset may be sorted may include, promoted streaming platforms, geographic location, and language.

Figure 5:
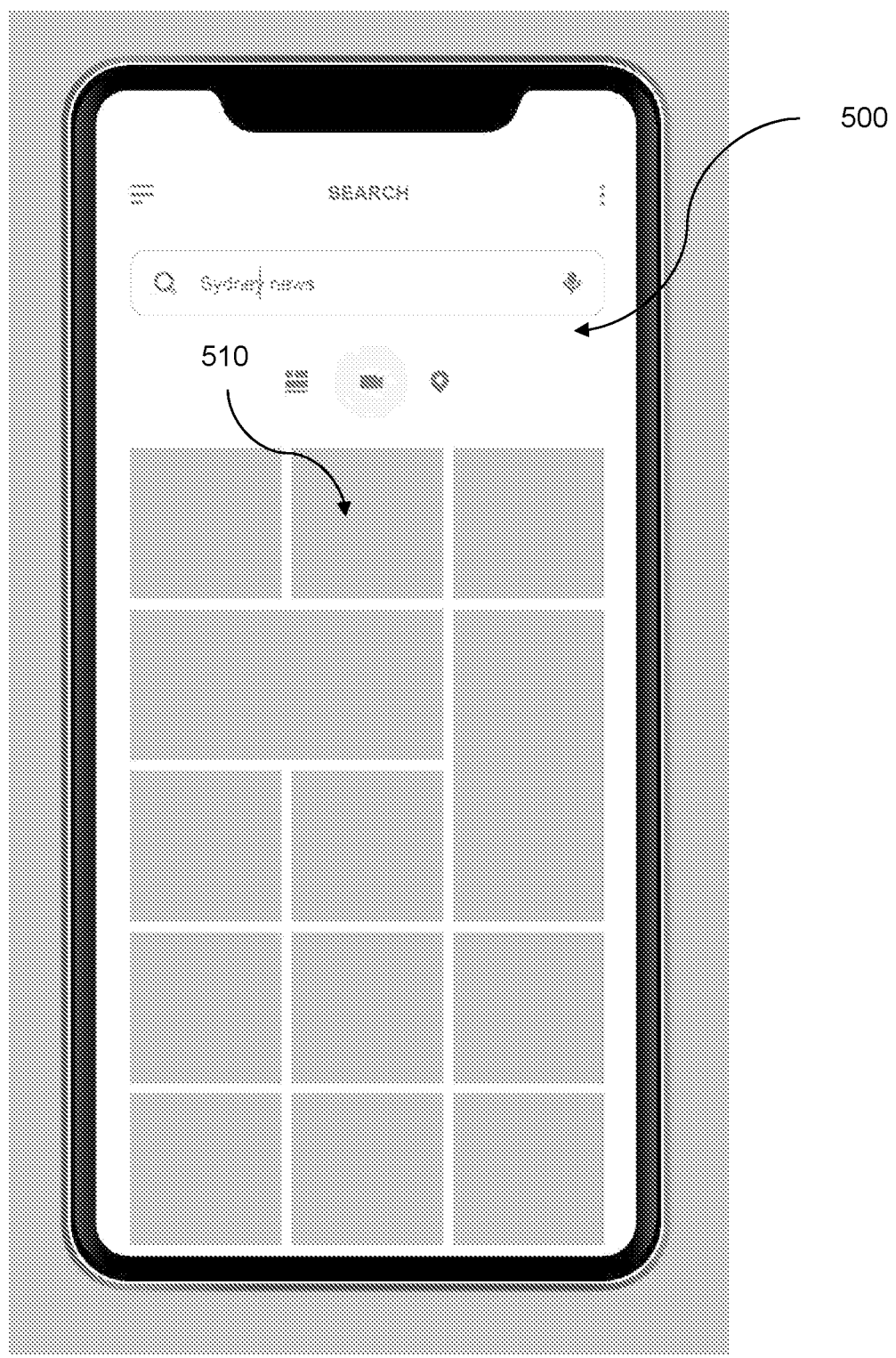
Figure 6:
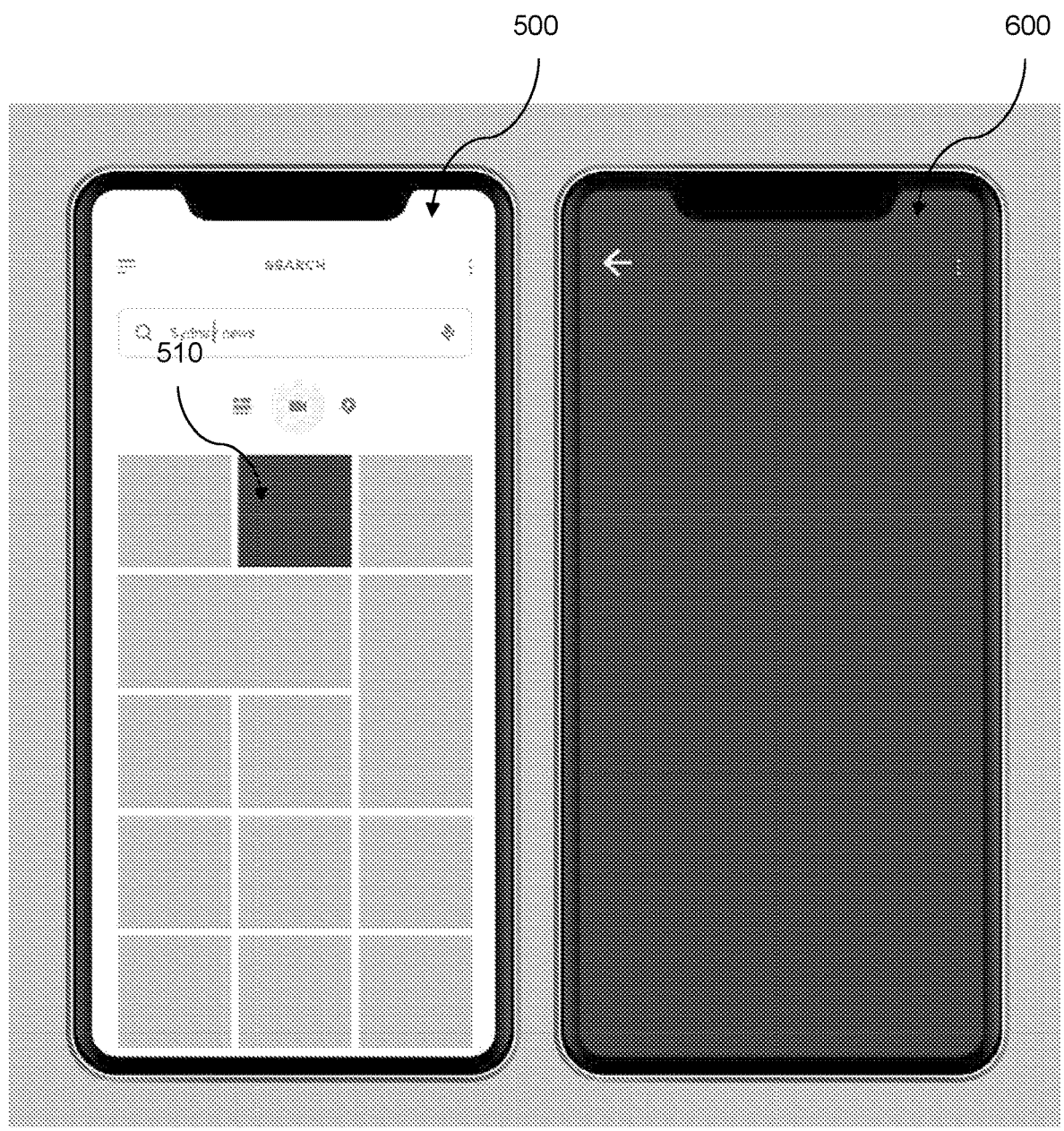

FIGS. 5 and 6 illustrate example GUIs 500, and 600 showing the published aggregated live stream data set, which has been sorted according to the defined criteria. The published dataset includes a tiled thumbnail display of the visual representations each associated with an active live stream. For the example shown, the visual representations 610 can be selected by an end user to navigate to the active live streams as shown in FIG. 6. The end user can also press the back button to return to the published aggregated dataset.

Figure 7:
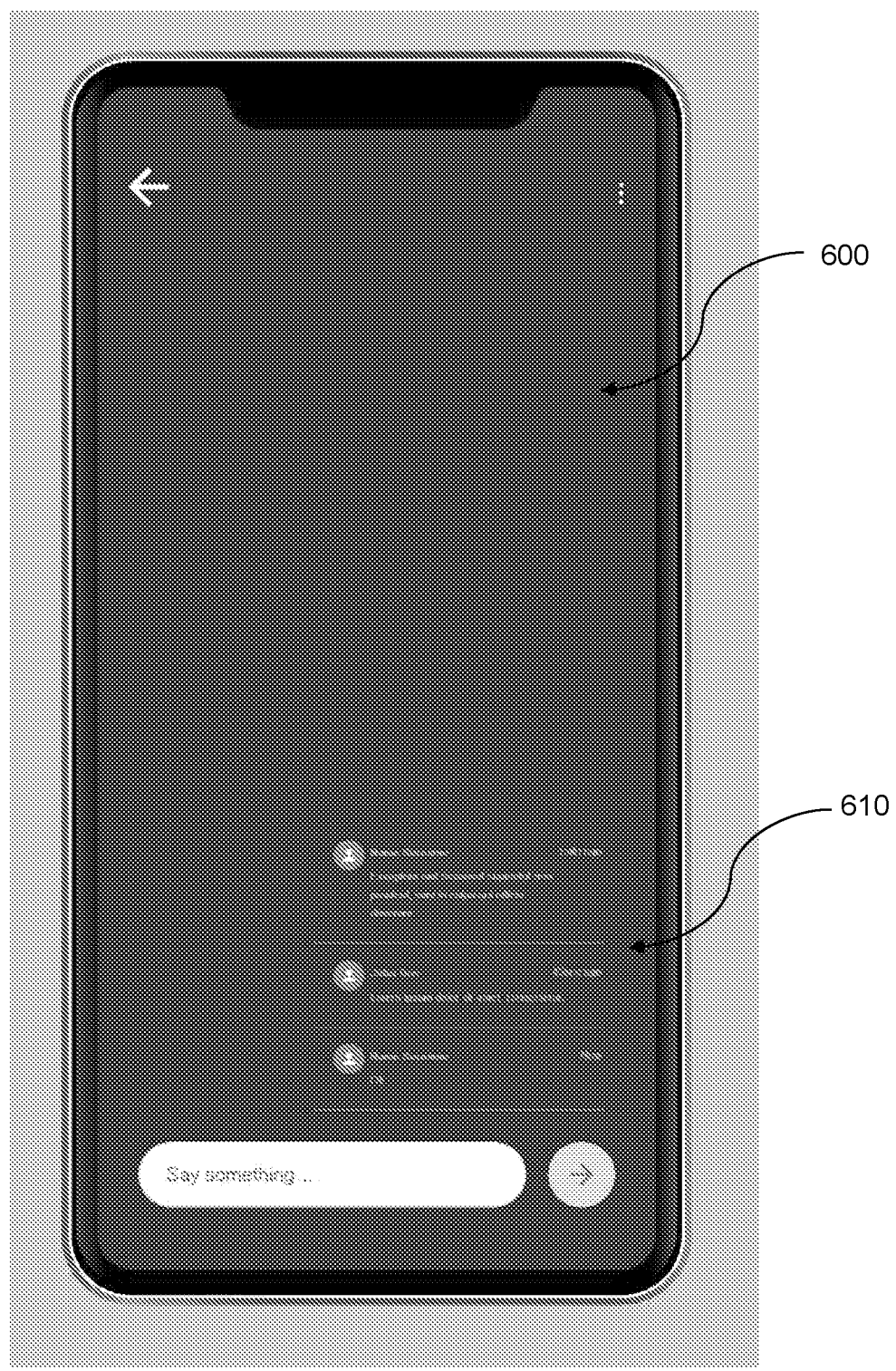

FIG. 7 illustrates example GUI 600 showing associated chat information, which may be included in the information collected from the live stream platforms.

Another embodiment of the present invention may provide a method that starts by receiving live video streams from different live streaming platforms. The live video streams may then be presented to users in video tiles in an aggregated live streaming platform. The users may be allowed to navigate and select among the video tiles of the aggregated live streaming platform to view and interact with the live video streams.

The method may further comprise analysing the live video streams to identify the live video streams with and without advertising (or sponsorship). For example, the live video streams may be analysed by an algorithm, such as a machine learning algorithm, to determine if they contain standardised or unique identifiers or metadata for advertising data in video streams.

Figure 8:
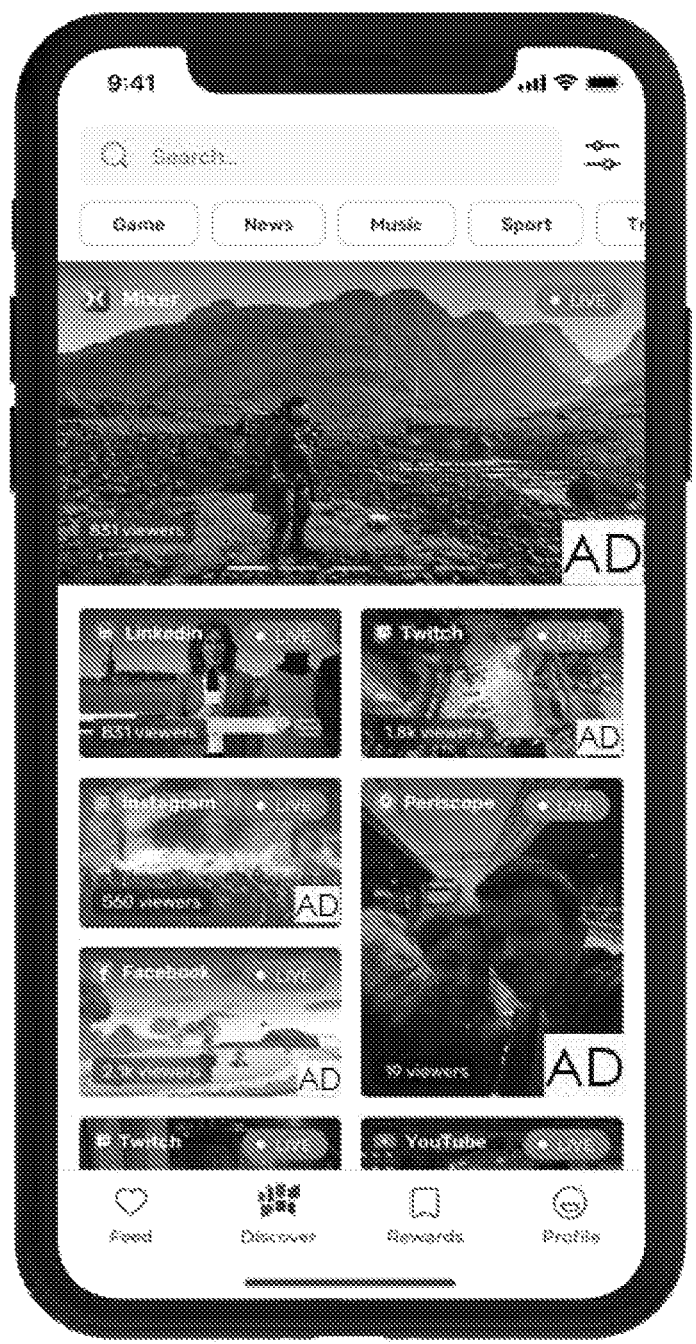
FIG. 8 is an example GUI for adding advertising to the live video streams.

The method may further comprise, for the live video streams without advertising, visually indicating availability to add advertising to the live video streams in the video tiles. Referring to FIG. 8, the availability to add advertising to the live video streams may be visually indicated in the video tiles by icons, for example, icon buttons labelled "AD". Advertisers may select a video tile to add advertising to a live video stream, and the aggregated live streaming platform may be configured to add or insert advertising data into the data of the live video stream.

The method may further comprise, for live video streams with advertising, identifying a type, timing and location of the advertising in the live video streams. The method may further comprise, for live video streams with advertising, adding additional advertising having a different type, timing and location to the live video streams.

The advertising features of the aggregated live streaming platform may be implemented in a dedicated advertising portal called "ADplace" which provides a marketplace for ad-agencies, businesses and users to find unsponsored content and place adverts against live video streams.

The method may further comprise configuring the aggregated live streaming platform to perform two or more operations selected from:
  managing the live video streams;
  manipulating the live video streams;
  broadcasting the live video streams;
  curating the live video streams;
  hosting the live video streams;
  editing the live video streams;
  switching between the live video streams;
  sequencing the live video streams;
  fragmenting the live video streams;
  adding advertising to the live video streams;
  adding pre-recorded video to the live video streams;
  adding text or graphics to the live video streams;
  providing live engagement tools during the live video streams;
  providing live questions and answers during the live video streams;
  providing live polls during the live video streams;
  providing live audience chat during the live video streams;
  providing personalised feeds of the live video streams to the users;
  receiving live votes for the live video streams from the users;
  receiving live rewards from the users for creators of the live video streams;
  notifying the creators that their live video streams have started live streaming on the aggregated live streaming platform;
  notifying the users that the live video streams have started live streaming on the aggregated live streaming platform based on viewing history, likes and follows;
  recommending the live video streams to the users based on viewing history, likes and follows;
  allowing the users to discover the live video streams based on viewing history, likes and follows;
  allowing the users to navigate the live video streams;
  allowing the users to select the live video streams for viewing;
  allowing the users to like the live video streams;
  allowing the users to share the live video streams with other users;
  allowing the users to comment on the live video streams;
  allowing the users to follow the creators of the live video streams;
  allowing the users to recommend the live video streams to other users;
  allowing the users to privately or publicly communicate with other users during the live video streams;
  allowing the different live streaming platforms to integrate or add their live video streams into the aggregated live streaming platform.

For example, the provider of the aggregated live streaming platform may host a selection of the live video streams from the different live streaming platforms, and switch between different live video streams at different times. The host may add live video between and to the live video streams.

The aggregated live streaming platform may, for example, provide a dedicated admin portal for allowing the different live streaming platforms to integrate their live video streams into the aggregated live streaming platform. Broadcasters and social networks may log in and integrate their feeds into the aggregated live streaming platform. For example, a TV network in Spain could log in and feed the content they choose to share on the aggregated live streaming platform without having to develop an API or plug-in.

The aggregated live streaming platform may also provide an integration feature between feed and discover tab to provide viewers with tailored content to suit their likes and follows.

The aggregated live streaming platform may also include a bot that is configured to scan the live video streams during API admission and automatically send the influencer/public figure that went live a message to advise them their content is now live on the aggregated live streaming platform. This is intended to promote the aggregated live streaming platform to creators of live video streams.

The aggregated live streamlining platform may also include a talk and text feature where users can communicate with friends and create communities to notify one another when content is live and discuss what they may be watching privately without public commentary.

The aggregated live streaming platform may further include a feature where users can promote content to their followers and be paid for referral/promotion. In addition, the aggregated live streaming platform may include a feature where users can vote on content and make financial tips or donations to content creators. For example, the provider of the aggregated live streaming platform may partner with live performance TV contests so when its live users can vote which would instantly provide the judges with votes to assist in deciding context winners. Another example is musicians busking on street corners can go live through a creation platform and once its streamed through the aggregated live streaming platform, users can make financial contributions to those buskers.

Embodiments of the present invention provide a live stream aggregating platform that is both generally and specifically useful for aggregating and publishing active live streams from multiple different live streaming platforms.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A method, comprising:
receiving live video streams from different live streaming platforms;
presenting the live video streams to users in video tiles in an aggregated live streaming platform;
allowing the users to navigate and select among the video tiles of the aggregated live streaming platform to view and interact with the live video streams;
analysing the live video streams to identify the live video streams with and without advertising; and
for the live video streams without advertising, visually indicating availability to add advertising to the live video streams in the video tiles.

2. The method of claim 1, wherein the availability to add advertising to the live video streams is visually indicated in the video tiles by icons.

3. The method of claim 1, further comprising, for live video streams with advertising, identifying a type, timing and location of the advertising in the live video streams.

4. The method of claim 1, further comprising configuring the aggregated live streaming platform to perform two or more operations selected from:
managing the live video streams;
manipulating the live video streams;
broadcasting the live video streams;
curating the live video streams;
hosting the live video streams;
editing the live video streams;
switching between the live video streams;
sequencing the live video streams;
fragmenting the live video streams;
adding advertising to the live video streams;
adding pre-recorded video to the live video streams;
adding text or graphics to the live video streams;
providing live engagement tools during the live video streams;
providing live questions and answers during the live video streams;
providing live polls during the live video streams;
providing live audience chat during the live video streams;
providing personalized feeds of the live video streams to the users;
receiving live votes for the live video streams from the users;
receiving live rewards from the users for creators of the live video streams;
notifying the creators that their live video streams have started live streaming on the aggregated live streaming platform;
notifying the users that the live video streams have started live streaming on the aggregated live streaming platform based on viewing history, likes and follows;
recommending the live video streams to the users based on viewing history, likes and follows;
allowing the users to discover the live video streams based on viewing history, likes and follows;
allowing the users to navigate the live video streams;
allowing the users to select the live video streams for viewing;
allowing the users to like the live video streams;
allowing the users to share the live video streams with other users;
allowing the users to comment on the live video streams;
allowing the users to follow the creators of the live video streams;
allowing the users to recommend the live video streams to other users;
allowing the users to communicate with other users during the live video streams;
allowing the different live streaming platforms to integrate their live video streams into the aggregated live streaming platform.

5. The method of claim 2, wherein the icons are icon buttons labelled "AD".

6. The method of claim 3, further comprising adding additional advertising having a different type, timing and location to the live video streams.

7. A system, comprising:
a non-transitory memory; and
one or more hardware processors coupled to the non-transitory memory and configured to read instructions from the non-transitory memory to cause the system to perform operations comprising:
receiving live video streams from different live streaming platforms;
presenting the live video streams to users in video tiles in an aggregated live streaming platform;
allowing the users to navigate and select among the video tiles of the aggregated live streaming platform to view and interact with the live video streams;
analysing the live video streams to identify the live video streams with and without advertising; and
for the live video streams without advertising, visually indicating availability to add advertising to the live video streams in the video tiles.

8. A non-transitory machine-readable medium having stored thereon machine-readable instructions executable to cause a machine to perform operations comprising:
receiving live video streams from different live streaming platforms;
presenting the live video streams to users in video tiles in an aggregated live streaming platform;
allowing the users to navigate and select among the video tiles of the aggregated live streaming platform to view and interact with the live video streams;
analysing the live video streams to identify the live video streams with and without advertising; and
for the live video streams without advertising, visually indicating availability to add advertising to the live video streams in the video tiles.

* * * * *